United States Patent
Meidan et al.

(10) Patent No.: US 12,231,899 B2
(45) Date of Patent: Feb. 18, 2025

(54) SYSTEM AND METHOD FOR MANAGING ACCESS TO SOFTWARE APPLICATIONS ON A MOBILE COMMUNICATION DEVICE VIA A PHONE LOCATION UNIT

(71) Applicant: SAVERONE 2014 LTD., Petah-Tikva (IL)

(72) Inventors: Aviram Meidan, Yehud-Monosson (IL); Omri Ravid, Kfar Saba (IL)

(73) Assignee: SAVERONE 2014 LTD., Petah-Tikva (IL)

( * ) Notice: Subject to any disclaimer, the term of this patent is extended or adjusted under 35 U.S.C. 154(b) by 408 days.

(21) Appl. No.: 17/681,957

(22) Filed: Feb. 28, 2022

(65) Prior Publication Data
US 2023/0276243 A1    Aug. 31, 2023

(51) Int. Cl.
*H04W 12/64* (2021.01)
*H04M 1/72463* (2021.01)
(Continued)

(52) U.S. Cl.
CPC ....... *H04W 12/64* (2021.01); *H04M 1/72463* (2021.01); *H04W 4/027* (2013.01);
(Continued)

(58) Field of Classification Search
CPC ..... H04W 12/64; H04W 4/027; H04W 4/029; H04W 4/48; H04W 12/30; H04W 4/80;
(Continued)

(56) References Cited

U.S. PATENT DOCUMENTS

| | | | |
|---|---|---|---|
| 8,676,268 B2 * | 3/2014 | Riggs | H04M 1/72463 455/565 |
| 10,075,581 B2 | 9/2018 | Cohen et al. | |

(Continued)

FOREIGN PATENT DOCUMENTS

| | | | | |
|---|---|---|---|---|
| CA | 2619300 C | * | 12/2012 | G06F 21/51 |
| EP | 3698579 B1 | * | 12/2021 | B60R 11/02 |

(Continued)

*Primary Examiner* — Jay P Patel
(74) *Attorney, Agent, or Firm* — PEARL COHEN ZEDEK LATZER BARATZ LLP

(57) ABSTRACT

A method and system for managing access to software applications installed on a mobile communication device, via a phone location unit. The method may include: determining a position of the at least one mobile communication device, using the phone location unit which is further configured to communicate with the at least one mobile communication device, over a wireless communication channel; blocking access to the software applications installed, by an access management software application, whenever the mobile communication device is detected within a specific area; launching, via the access management software application, at least one whitelisted software application, responsive to a selection by a human user; and repeatedly instructing the mobile communication device, by the phone location unit and over the wireless communication channel, to re-launch the at least one whitelisted software application, as long as the at least one mobile communication device is detected within the specific area.

20 Claims, 4 Drawing Sheets

(51) Int. Cl.
*H04W 4/02* (2018.01)
*H04W 4/029* (2018.01)
*H04W 4/48* (2018.01)
*H04W 12/30* (2021.01)

(52) U.S. Cl.
CPC .............. *H04W 4/029* (2018.02); *H04W 4/48* (2018.02); *H04W 12/30* (2021.01)

(58) Field of Classification Search
CPC ............ H04M 1/72463; G06F 21/1013; G06F 21/121; H04L 63/107
See application file for complete search history.

(56) References Cited

U.S. PATENT DOCUMENTS

| | | |
|---|---|---|
| 10,557,917 B2 | 2/2020 | Shoshan et al. |
| 2010/0291868 A1* | 11/2010 | Meiri ....................... H04B 5/48 |
| | | 455/507 |
| 2014/0342718 A1* | 11/2014 | Chen ....................... H04W 4/40 |
| | | 455/418 |
| 2017/0201619 A1 | 7/2017 | Cohen |
| 2018/0041630 A1* | 2/2018 | Moir ....................... H04W 24/08 |
| 2018/0341534 A1* | 11/2018 | Breaux ................. H04W 4/029 |
| 2019/0146858 A1* | 5/2019 | Breaux ................... B60K 35/00 |
| | | 719/328 |
| 2019/0213063 A1* | 7/2019 | Breaux ................... H04W 4/33 |
| 2020/0228646 A1 | 7/2020 | Hotes |
| 2021/0337460 A1* | 10/2021 | Breaux, III ............. H04W 8/18 |
| 2023/0027582 A1* | 1/2023 | Meidan ............ B60R 21/01516 |

FOREIGN PATENT DOCUMENTS

| | | | | |
|---|---|---|---|---|
| WO | WO-2011025604 A1 | * | 3/2011 | .......... H04M 1/6075 |
| WO | WO-2013011512 A1 | * | 1/2013 | ........... H04L 63/107 |
| WO | WO-2022162172 A1 | * | 8/2022 | ......... G07C 9/00309 |
| WO | WO-2023161922 A1 | * | 8/2023 | ............ B60W 40/09 |

\* cited by examiner

SYSTEM AND METHOD FOR MANAGING ACCESS TO SOFTWARE APPLICATIONS ON A MOBILE COMMUNICATION DEVICE VIA A PHONE LOCATION UNIT

FIELD OF THE INVENTION

The present invention relates generally to the field of managing access to software applications on a smartphone, and more particularly to managing such an access for driver's safety purposes.

BACKGROUND OF THE INVENTION

Automatically locating a mobile communication device within a defined volume is known in the art and has many applications. One known application refers to determining whether a mobile communication device is being used by a driver of a moving vehicle. Such a solution is described in U.S. Pat. No. 10,075,581 which is incorporated herein by reference in its entirety. Further improvements to the localization of a mobile communication device within a defined volume have been described in U.S. Pat. No. 10,557,917 which is also incorporated herein by reference in its entirety.

In some driver's safety systems, the access to software applications ("apps") on the smartphone while driving may be restricted once the smartphone has been detected by a phone location unit (PLU) to be within the driver's canopy. However, while some software applications are regarded as entirely prohibited for use while driving (so called "blacklisted applications") it is desirable that other software applications may be approved for user while driving (so called "whitelisted applications").

In order to achieve that, the whitelisted software applications may only be launched from a portal of the driver's safety software application installed on the smartphone. The challenge is that once a whitelisted software application has been launched, the human user may browse to other software applications which may be blacklisted software applications. This may happen if the operating system does not provide an indication to which software application is currently on the foreground of the smartphone or running in the background. The lack of ability to know which application is running in the foreground is typical to iOS-based mobile communication devices.

SUMMARY OF THE INVENTION

In order to address the aforementioned challenge, it has been suggested by the inventors of the present invention, to use a wireless communication channel between the phone location unit and the mobile communication device through which selected whitelisted software application is repeatedly re-launched, thereby ensuring that the human user to remain in the whitelisted software application he or she has selected. The human user can at any time switch to any other whitelisted software application, and the above process with be repeated with the newly selected whitelisted software application.

According to some embodiments of the present invention, a method and system for managing access to software applications installed on a mobile communication device, via a phone location unit, are provided herein. The method may include the following steps: determining a position of the at least one mobile communication device, using the phone location unit which is further configured to communicate with the at least one mobile communication device, over a designated wireless communication channel; blocking access to the software applications installed, by an access management software application, whenever the mobile communication device is detected within a specific area; launching, via the access management software application, at least one whitelisted software application, responsive to a selection by a human user; and repeatedly instructing the mobile communication device, by the phone location unit and over the designated wireless communication channel, to re-launch the at least one whitelisted software application, as long as the at least one mobile communication device is detected within the specific area.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
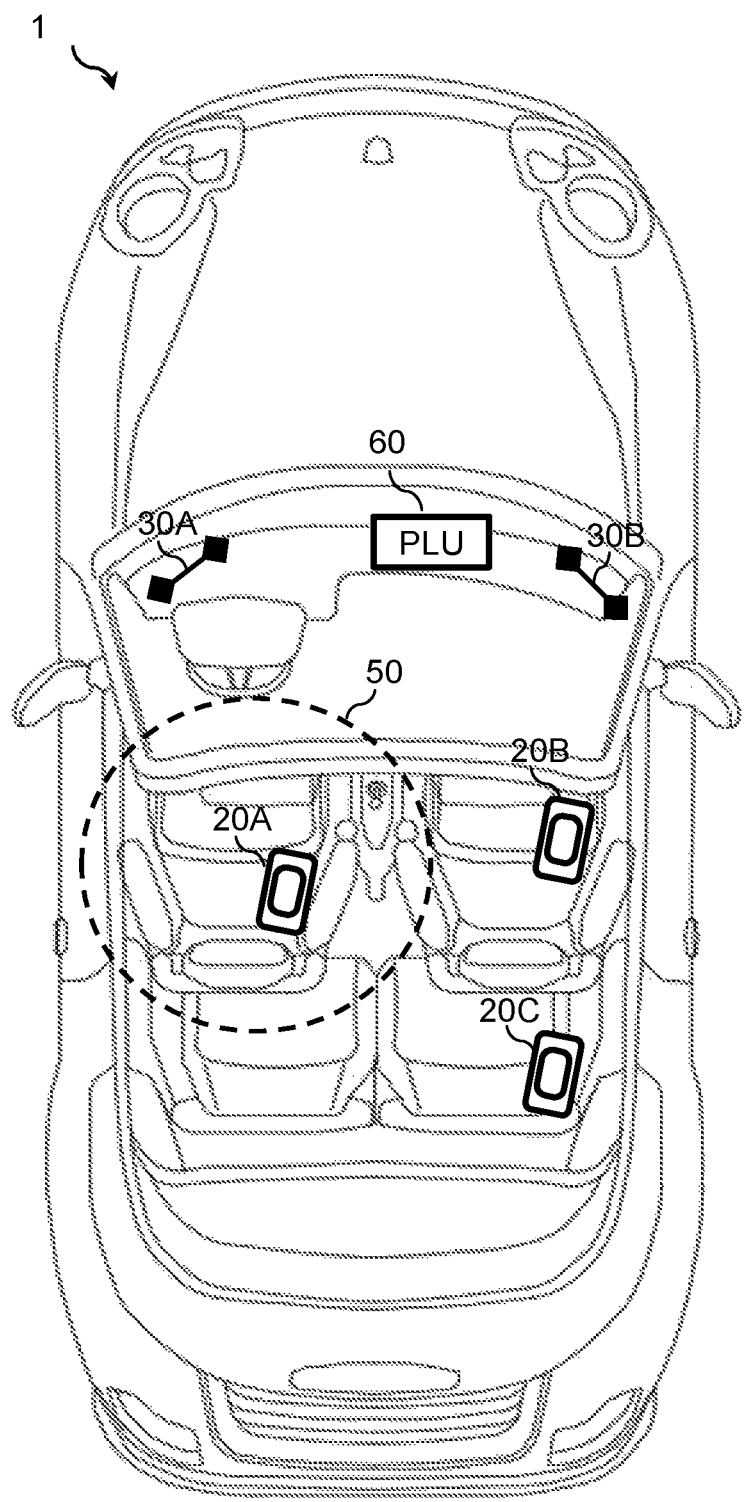
FIG. 1 is a high-level block diagram illustrating a deployment of the system in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Prior to setting forth the detailed description of the invention, it may be helpful to provide herein definitions of certain terms that will be used hereinafter.

The terms "volume", "defined volume" or "closed volume" as used herein are defined as any well-defined volume with boundaries that can be set or detected. The volume is typically a vehicle such as a car, train, airplane, ship, but can also be a motorbike or any other moving platform. The volume can also relate to a room such as a conference room, a theater, and the like. The defined volume herein is in contrast with an open space whose boundaries cannot be easily defined.

The term "mobile communication device" as used herein is defined as any electronic device which is small enough to be carried by a human user and further has radio frequency (RF) wireless communication capabilities. The mobile communication device is typically a phone such as a smartphone, a smartwatch, a laptop, a tablet, or a game console. The mobile communication device may support audio calls or transmitting and receiving data and may or not have a touch screen.

The term "phone location unit" or PLU as used herein is defined as a hardware-based device typically including a set of RF receiving antennas placed in a known location within the defined volume, a receiver, and a computer processor. The PLU can locate a mobile communication device based on processing the RF signals received by its antennas.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a block diagram illustrating a system for controlling the access to software application installed on communication device 20A-20C located within a defined or closed volume, such as car 1, based on their location, provided that these application have been pre-approved for use while driving as "whitelisted software applications"

According to some embodiments of the present invention, the localization of the mobile communication device 20A-20C by PLU 60 may be based on at least one of: angle of arrival (e.g., using directional antennas, monopulse antennas, antenna arrays, etc.), time of flight (e.g., using UWB round trip time measurements), or received intensity of radio frequency (RF) signals transmitted by the at least one mobile communication device 20A-20C and received by the PLU 60 which may include a transceiver (not shown) and at least two pairs of antennas 30A, 30B and further configured to wirelessly communicate with the at least one mobile communication device 20A-20C.

According to some embodiments, the defined volume 1 is any type of vehicle such as a car, train, airplane, ship, but can also be a motorbike or any other moving platform.

Figure 2A:
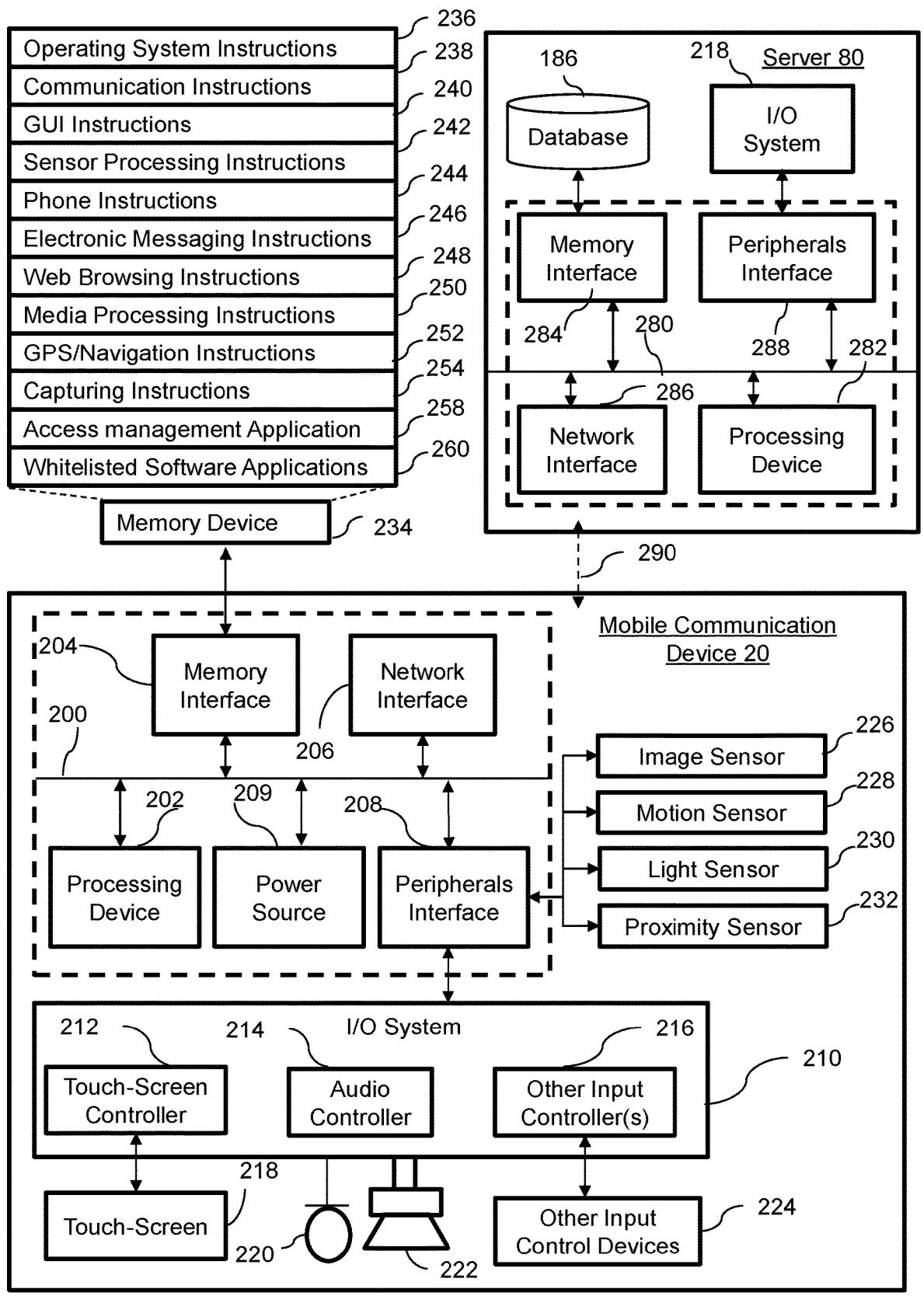
FIG. 2A is a detailed block diagram illustrating an exemplary architecture of a mobile communication device in communication with a server in accordance with some embodiments of the present invention.

FIG. 2A shows an exemplary block diagram of the configuration of a server 80 and a mobile communication device 20. According to some embodiments of the present invention, a server 80 for managing access to software application installed on at least one mobile communication device 20 within a defined volume, based on the mobile communication device position and at least one sensor, is illustrated herein.

In one embodiment, server 80, directly or indirectly, may access a bus 280 (or another data transfer mechanism) that interconnects subsystems and components for transferring information within the server 80. For example, 280 may interconnect a processing device 282, a memory interface 284, a network interface 286, a peripherals interface 288 connected to I/O system 218. The server 80 may comprise a power source (not shown).

In accordance with some embodiments of the present invention, server may include a network interface 286 configured to receive, from a PLU (not shown here), a position of the at least one mobile communication device, relative to a frame of reference of the defined volume, based on at least one of: angle of arrival, time of flight, or received intensity of radio frequency (RF) signals transmitted by the at least one mobile communication device and received by the PLU located within the defined volume and comprising a transceiver and antennas and further configured to communicate with the at least one mobile communication device over a wireless communication channel.

Server 80 may further include a processing device 282; and a memory interface 284 comprising a set of instructions that when executed on the processing device, causes the processing device to send the at least one mobile communication device via the network interface instructions that: block access to the software applications installed on the at least one mobile communication device, whenever the at least one mobile communication device is detected by the PLU to be within a specific area within the defined volume, based on the position determined by the PLU; launch, at least one whitelisted software application, out of the software applications installed on the at least one mobile communication device, responsive to a selection by a human user, repeatedly instruct the PLU to instruct the at least one mobile communication device, over the wireless communication channel, to re-launch the at least one whitelisted software application, as long as the at least one mobile communication device is detected within the specific area.

Processing device 282 may include at least one processor configured to execute computer programs, applications, methods, processes, or other software to perform embodiments described in the present disclosure. For example, the processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The processing device may include at least one processor configured to perform functions of the disclosed methods. The processing device may include a single-core or multiple core processors executing parallel processes simultaneously. In one example, the processing device may be a single-core processor configured with virtual processing technologies. The processing device may be implemented using a virtual machine architecture or other methods that provide the ability to execute, control, run, manipulate, store, etc., multiple software processes, applications, programs, etc. In another example, the processing device may include a multiple-core processor architecture (e.g., dual, quad-core, etc.) configured to provide parallel processing functionalities to allow a device associated with the processing device to execute multiple processes simultaneously. It is appreciated that other types of processor architectures could be implemented to provide the capabilities disclosed herein.

In some embodiments, processing device 282 may use a memory interface 284 to access data and a software product stored on a memory device or a non-transitory computer-readable medium or to access a data structure 186. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, any other optical data storage medium, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within the server 80, or at a remote location. Additionally, one or more computer-readable storage mediums can be utilized in implementing a computer-implemented method. The term "computer-readable storage medium" should be understood to include tangible items and exclude carrier waves and transient signals.

According to some embodiments, the network interface 286 may provide two-way data communication to a network. In FIG. 2A, the communication 290 between the mobile communication device 20 and server 80 is represented by a dashed arrow. In one embodiment, the network interface 286 may include an integrated services digital network (ISDN) card, cellular modem, satellite modem, or a modem to provide a data communication connection over the Internet. As another example, the network interface 286 may include a wireless local area network (WLAN) card. In another embodiment, the network interface 286 may include an Ethernet port connected to radio frequency receivers and transmitters. The specific design and implementation of the network interface 286 may depend on the communications network(s) over which the mobile communication device 20 and the server 80 may communicate.

According to some embodiments, the server 80 may also include a peripherals interface 288 coupled to the bus 280. The peripherals interface 288 may also be connected to devices, and subsystems to facilitate multiple functionalities as performed by the server 80. In some embodiments, those devices and subsystems may comprise a display screen (e.g., CRT or LCD) a USB port, and the like.

With regard to the mobile communication device 20, and according to some embodiments, the mobile communication device 20, directly or indirectly, may access a bus 200 (or another data transfer mechanism) that interconnects subsystems and components for transferring information within the mobile communication device 20. For example, bus 200 may interconnect a processing device 202, a memory interface 204, a network interface 206, a peripherals interface 208 connected to I/O system 210. A power source 209 provides the power to the mobile communication device and it may include a primary or a rechargeable battery (not shown), DC-DC converters (not shown) and other components required for the proper operation of the device 20.

Processing device 202 may include at least one processor configured to execute computer programs, applications, methods, processes, or other software to perform embodiments described in the present disclosure. For example, the processing device 202 may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The processing device 202 may include at least one processor configured to perform functions of the disclosed methods. The processing device may include a single-core or multiple core processors executing parallel processes simultaneously. In one example, the processing device may be a single-core processor configured with virtual processing technologies. The processing device may be implemented using a virtual machine architecture or other methods that provide the ability to execute, control, run, manipulate, store, etc., multiple software processes, applications, programs, etc. In another example, the processing device may include a multiple-core processor architecture (e.g., dual, quad-core, etc.) configured to provide parallel processing functionalities to allow a device associated with the processing device to execute multiple processes simultaneously. It is appreciated that other types of processor architectures could be implemented to provide the capabilities disclosed herein.

In some embodiments, processing device 202 may use a memory interface 204 to access data and a software product stored on a memory device or a non-transitory computer-readable medium. For example, processing device 202 may use a memory interface 204 to access a memory device 234. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, any other optical data storage medium, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within mobile communication device 20 or at a remote location. Additionally, one or more computer-readable storage mediums can be utilized in implementing a computer-implemented method. The term "computer-readable storage medium" should be understood to include tangible items and exclude carrier waves and transient signals.

According to some embodiments, the network interface 206 may provide two-way data communication to a wireless network. In one embodiment, the network interface 206 may include an integrated services digital network (ISDN) card or module, cellular modem, satellite modem, or a modem to provide a data communication connection over the Internet. As another example, the network interface 206 may include a wireless local area network (WLAN) card or module. For example, in some embodiments, the network interface 206 is designed to operate over a Wi-Fi or Bluetooth® networks. In another embodiment, the network interface 206 may include an Ethernet port connected to radio frequency receivers and transmitters and in some embodiments also connected to optical (e.g., infrared) receivers and transmitters. The specific design and implementation of the network interface 206 may depend on the communications network(s) over which the mobile communication device 20 is intended to operate. In any such implementation, the network interface 206 may be configured to send and receive electrical, electromagnetic, or optical signals that carry digital data streams representing various types of information.

According to some embodiments, the peripherals interface 208 may also be connected to sensors, devices, and subsystems to facilitate multiple functionalities. In one embodiment, the peripherals interface 208 may be connected to an I/O system 210 configured to receive signals or input from devices and to provide signals or output to one or more devices that allow data to be received and/or transmitted by the mobile communication device 20. In one example, the I/O system 210 may include a touch screen controller 212, audio controller 214, and/or other types of input controller(s) 216. The touch screen controller 212 may be coupled to a touch screen 218. The touch screen 218 and the touch screen controller 212 may, for example, detect contact, movement, using any of a plurality of touch sensitivity technologies, including but not limited to capacitive, resistive, infrared, and surface acoustic wave technologies as well as other proximity sensor arrays or other elements for determining one or more points of contact with the touch screen 218. The touch screen 218 may also, for example, be used to implement virtual or soft buttons and/or a keyboard. While a touch screen 218 is shown in FIG. 2A, I/O system 210 may include a display screen (e.g., LCD or LED) in place of a touch screen 218. The audio controller 214 may be coupled to a microphone 220 and to a speaker 222 to facilitate voice-enabled functions, such as voice recognition, voice replication, digital recording, and telephony functions. The other input controller(s) 216 may be coupled to other input/control devices 224, such as one or more buttons, rocker switches, thumbwheel, infrared port, USB port, and/or a pointer device such as a stylus.

According to some embodiments, the peripherals interface 208 may also be connected to an image sensor 226, a motion sensor 228, a light sensor 230, and/or a proximity sensor 232 to facilitate image capturing, orientation, lighting, and proximity functions. Other sensors (not shown) may also be connected to the peripherals interface 208, such as a temperature sensor, a biometric sensor, or other sensing devices that facilitate related functionalities. In addition, a GPS receiver may also be integrated with, or connected to, the mobile communication device 20, such as GPS receivers typically integrated into mobile communications devices. Alternatively, GPS software may permit the mobile communication device 20 to access an external GPS receiver (e.g., connecting via a serial port or Bluetooth).

Consistent with the present disclosure, the mobile communication device 20 may use a memory interface 204 to access a memory device 234. The memory device 234 may include high-speed random-access memory and/or non-volatile memory such as one or more magnetic disk storage devices, one or more optical storage devices, and/or flash memory (e.g., NAND, NOR). The memory device 234 may store an operating system 236, such as Android, iOS, MS Windows, Linux, or any other embedded operating system. The operating system 236 may include instructions for handling basic system services and for performing hardware-dependent tasks. In some implementations, the operating system 236 may be a kernel (e.g., Linux kernel).

The memory device 234 may also store communication instructions 238 to facilitate communicating with one or more additional devices, one or more computers, and/or one or more servers. The memory device 234 may include: graphical user interface instructions 240 to facilitate graphic user interface processing; sensor processing instructions 242 to facilitate sensor-related processing and functions; phone instructions 244 to facilitate phone-related processes and functions; electronic messaging instructions 246 to facilitate electronic-messaging related processes and functions; web browsing instructions 248 to facilitate web browsing-related processes and functions; media processing instructions 250 to facilitate media processing-related processes and functions; GPS/navigation instructions 252 to facilitate GPS and navigation-related processes and instructions; capturing instructions 254 to facilitate processes and functions related to image sensor 226.

According to some embodiments of the present invention, access management application 258 may manage selective access to one or more of whitelisted software applications 260 that are installed on memory device 234. Whitelisted software applications 260 are a subset of all other software applications (not shown here) that have been installed on memory device 234 and have not been approved for launching while driving.

Each of the above-identified instructions and applications may correspond to a set of instructions for performing one or more functions described above. These instructions do not necessarily need to be implemented as separate software programs, procedures, or modules. The memory device 234 may include additional instructions or fewer instructions. Furthermore, various functions of the mobile communication device 20 may be implemented in hardware and/or in software, including in one or more signal processing and/or application-specific integrated circuits.

The components and arrangements shown in FIG. 2A for both the server 80 and the mobile communication device 20 are not intended to limit the disclosed embodiments. As will be appreciated by a person skilled in the art having the benefit of this disclosure, numerous variations and/or modifications may be made to the depicted configuration of the server 80. For example, not all the depicted components may be essential for the operation of server 80 in all cases. Any component may be located in any appropriate part of the server 80, and the components may be rearranged into a variety of configurations while providing the functionality of the disclosed embodiments. For example, some servers may not include all the elements in I/O system 218. Similarly, not all the depicted components may be essential for the operation of the mobile communication device 20 in all cases. For example, some types of mobile communication devices may include only part of the depicted sensors and include sensors which are not depicted.

In operation, PLU 60 may be configured to determine a position of the at least one mobile communication device 20A-20C, relative to a frame of reference of the defined volume 1, based on at least one of: angle of arrival, time of flight, or received intensity of radio frequency (RF) signals transmitted by the at least one mobile communication device and received by PLU 60 located within defined volume 1 and may include a transceiver and antennas and further configured to communicate with the at least one mobile communication device over a wireless communication channel.

In accordance with some embodiments of the present invention, access management software application 258 installed on the at least one mobile communication device 20A-20C, may include a set of instructions that when executed on at least one processing device 202 of the at least one mobile communication device 20A-20C causes the at least one processing device 202 to: block access to the software applications installed on the at least one mobile communication device, whenever the at least one mobile communication device is detected by PLU 60 to be within a specific area within the defined volume, based on the position determined by the PLU; launch, at least one whitelisted software application 260, out of the software applications installed on the at least one mobile communication device 20, responsive to a selection by a human user.

In accordance with some embodiments of the present invention, PLU 60 may be configured to repeatedly instruct the at least one mobile communication device, over the wireless communication channel, to re-launch the at least one whitelisted software application, as long as the at least one mobile communication device is detected within the specific area.

In accordance with some embodiments of the present invention, the wireless communication channel is Bluetooth and specifically low power Bluetooth where the mobile communication device 20A-20C and the PLU 60 connection is always "ON".

In accordance with some embodiments of the present invention the repeatedly instructing is carried out by a Human Interface Devices (HID) script. For example, the script may contain the URL address of the whitelisted application to be launched.

Figure 2B:
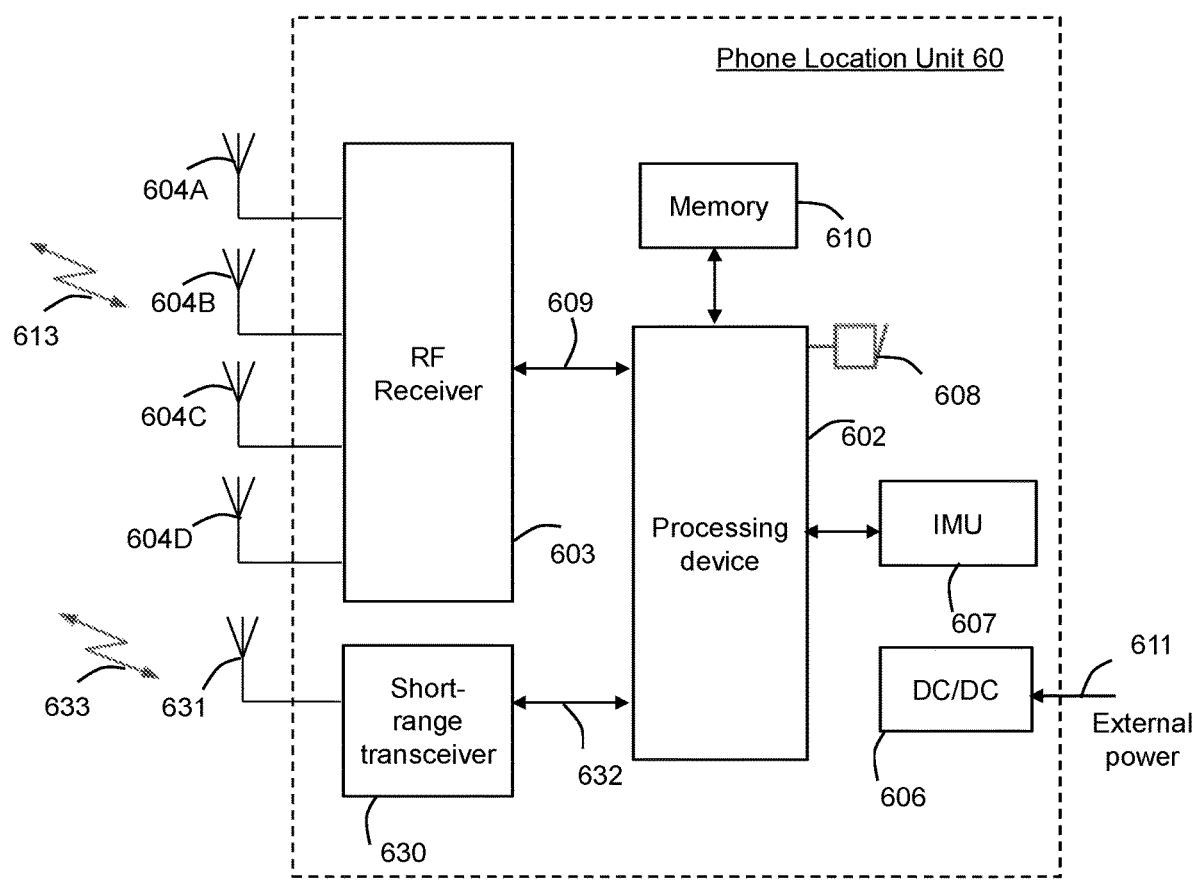
FIG. 2B is a detailed block diagram illustrating an exemplary architecture of a phone location unit in accordance with some embodiments of the present invention.

Referring now to FIG. 2B, the block diagram of an exemplary phone location unit 60 is depicted.

In one embodiment, Phone Location Unit 60 may comprise a processing unit 602 which may control the Phone Location Unit 60, at least one RF receiver 603 coupled 609 to the processing unit 602 and coupled to a plurality of antennas 604A-604D, an inertial measurement unit (IMU) 607 such as an accelerometer, magnetometer or, gyroscope, a buzzer 608 for providing audio notifications, and a DC/DC converter 606 that may provide the required power to each of the Phone Location Unit 60 functions. The coupling 609 between the at least one RF receiver 603 and processing unit 602 may consist of a digital data bus, comprising sampled data from an Analog-to-Digital component (not shown) in the receiver 603. The A/D samples may be processed by the processing unit 602 to detect and locate the source of the received signals 613.

According to some embodiments, the processing unit 602 may also interface with a memory 610. The memory device 610 may include high-speed random-access memory and/or non-volatile memory such as one or more magnetic disk storage devices, one or more optical storage devices, and/or flash memory (e.g., NAND, NOR). The memory device 610 may store an operating system, such as Android, iOS, MS Windows, Linux, or any other embedded operating system. The operating system may include instructions for handling basic system services and for performing hardware-dependent tasks. In some implementations, the operating system may be a kernel (e.g., Linux kernel).

The memory device 610 may also store communication instructions to facilitate communicating with one or more additional devices, one or more computers, and/or one or more servers. The memory device 610 may include: graphical user interface instructions to facilitate graphic user interface processing; sensor processing instructions to facilitate sensor-related processing and functions; signal processing instructions to facilitate signal processing algorithms and functions; electronic messaging instructions to facilitate electronic-messaging related processes and functions; web browsing instructions to facilitate web browsing-related processes and functions; media processing instructions to facilitate media processing-related processes and functions; GPS/navigation instructions to facilitate GPS and navigation-related processes and instructions; and/or other software instructions to facilitate other processes and functions.

In one embodiment, the Analog-to-Digital (A/D) component is part of the RF receiver unit 603 wherein analog signals are provided by the RF receiver 603 through the coupling 609. In one embodiment each coupling 609 may use a plurality of lanes (e.g., 2 lanes) in order to reduce the data rate at every single lane.

In some embodiments, the DC/DC converter may also be connected 611 to an external power source. According to one embodiment, the external power source is a vehicle's battery.

In one embodiment, a mobile communication device 20 (not shown) within a defined volume (e.g., vehicle's cabin) in which the antennas 604A-604D are deployed and operative to receive wireless signals 613 transmitted by the mobile communication device 20, may be located in a predetermined area (e.g., driver's seat area) inside the defined volume.

According to one embodiment, the antennas 604A-604D may be installed in different places in the volume in order to create space diversity to the wireless signals 613 transmitted within the volume. The places in which those antennas 604A-604D are installed may have a significant influence on the phone location unit 60 performance and to its ability to locate a mobile communication device 20 in a predetermined area (e.g., driver's seat area or passenger's area). According to one embodiment, the placement of the antennas 604A-604D may be optimized to locate mobile communication devices 60 in the driver's seat area.

According to one embodiment, the Phone Location Unit 60 may further comprise an embedded short-range wireless link (e.g., an IEEE802.11a/b/g/n/ac/ad WLAN and/or BT/BLE transceiver) 630. The short-range transceiver 630 may comprise an antenna (internal or external) 631 and may be connected 632 to the processing unit 602. In one embodiment, the short-range transceiver 630 may communicate 633 with a mobile communication device in communication range. According to one embodiment, the short-range communication 633 may be performed through an IEEE802.11a/b/g/n/ac/ad Access Point, hub, gateway or the like (not shown).

In one embodiment, the at least one RF receiver 603 may be programmed to receive signals in the frequency band of the wireless signals 613 transmitted by the mobile communication device 20. According to one embodiment, the RF receiver 603 may be connected one at a time to each of the antennas 604A-604D. This connection may be performed by an RF switch (not shown), typically with a low insertion loss and low noise figure. The architecture of the RF receiver 603 may differ among different implementations of the Phone Location Unit 60. In one embodiment, it may comprise a low noise amplifier (LNA), bandpass filters, a synthesizer, a mixer, an IQ demodulator, low pass filters, and analog-to-digital converters. The sampled baseband signals may be transferred 609 to a processing unit 602 to be further processed.

The processing unit 602 may the collection process until enough signal samples from each of the antennas 604A-604D are collected in order to estimate the location of the mobile communication device 20 in the volume.

According to one embodiment of the present invention, the Phone Location Unit 60 may utilize one of the following methods or any combination of them, to locate the position of the mobile communication device 20 in a defined volume and/or detect its presence in a predetermined area:

Received Signal Strength Indicator (RSSI): Using the RSSI at each antenna to estimate the wireless device distance to that antenna and then using triangulation techniques. This method may utilize the ratio of the RSSI at each antenna pair 604A-604D.

Channel fingerprinting: Generating a radio map of the volume comprising RF-parameters signatures at each of the antennas 604A-604D. Then estimating the mobile communication device position by correlating measured values of RF parameters at each antenna to fingerprints values in the radio map. Fingerprinting methods may utilize Power Level (RSSI) based methods and Delay-spread based methods.

Time Differential-Of-Arrival (TDOA): Estimating the position of the mobile communication device 20 by multilateration of hyperbolae. For example, the Phone Location Unit 60 may comprise four antennas and two RF receivers, wherein the two RF receivers are selectively connected to a pair of antennas for a TDOA measurement.

Round-Trip time (RTT): Estimating the position of the mobile communication device 20 by multilateration of circles. For example, the Phone Location Unit 60 may comprise four antennas and one RF transceiver, wherein the RF transceiver is selectively connected to an antenna 604A-604D for an RTT measurement.

Angle-Of-Arrival (AOA)/Direction-Of-Arrival (DOA) technology: Estimating the angle or direction of arrival at each of the antennas of wireless signals 613 transmitted by the mobile communication device and then using this information to locate the device.

The above-described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), IEEE802.11a/b/g/n/ac/ad network, IEEE802.15.4, IEEE802.16 network, general packet radio service (GPRS) network, HiperLAN), and/or other packet-based wireless networks, a wireless network (e.g., RAN, Bluetooth®, code-division multiple access (CDMA) network, time division multiple access (TDMA) network, global system for mobile communications (GSM) network, EDGE, and GPRS), 3G, LTE or 5G, and/or other circuit-based networks.

Figure 3:
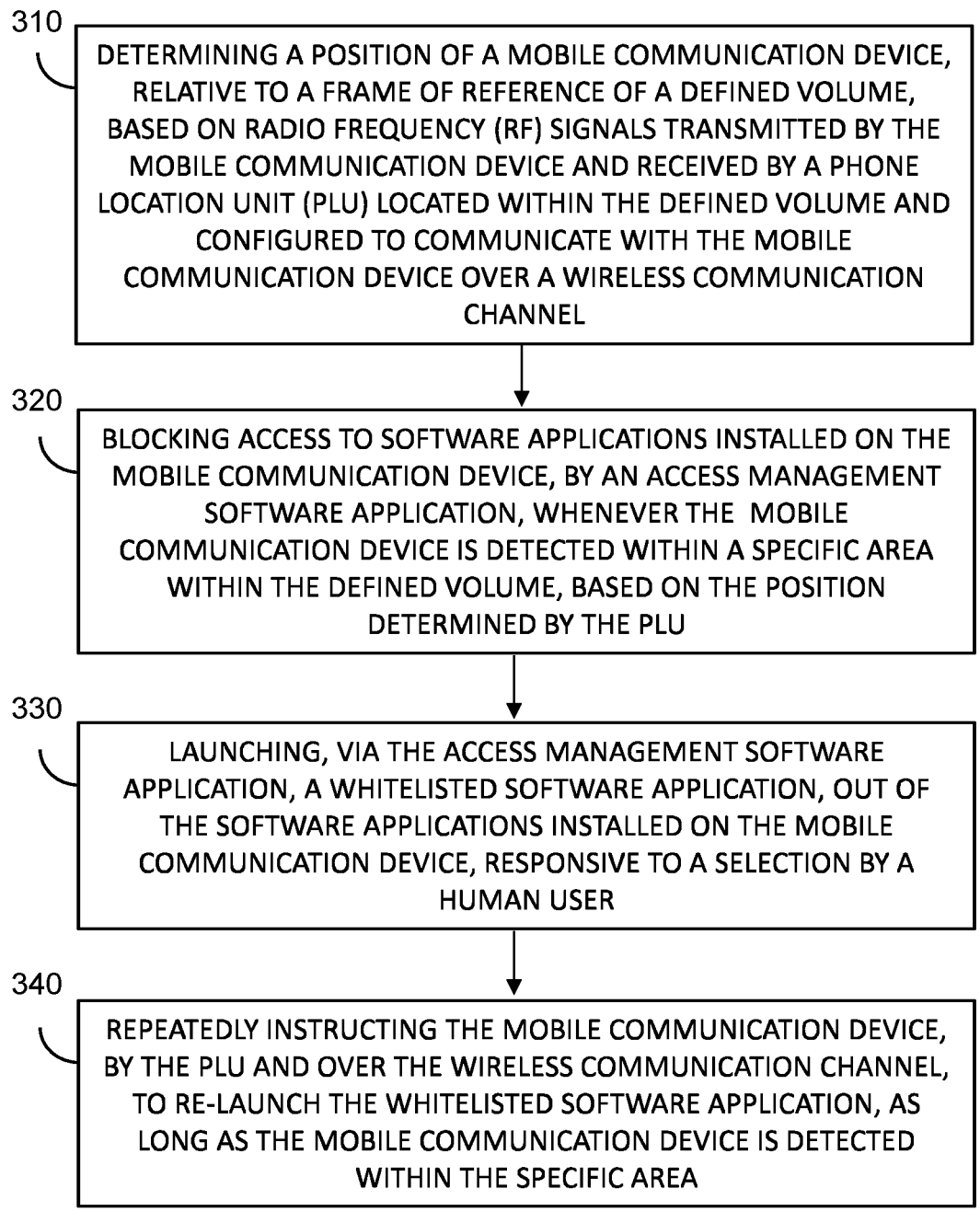
FIG. 3 is a high-level flowchart illustrating a method for managing access to software applications of a mobile communication device in accordance with embodiments of the present invention.

FIG. 3 is a high-level flowchart illustrating a method 300 for of managing an access to software applications installed on a mobile communication device, via a phone location unit (PLU) in a defined volume. Method 300 may include the following steps: determining a position of the at least one mobile communication device, relative to a frame of reference of the defined volume, based on at least one of: angle of arrival, time of flight, or received intensity of radio frequency (RF) signals transmitted by the at least one mobile communication device and received by the PLU located within the defined volume and comprising a transceiver and antennas and further configured to communicate with the at least one mobile communication device over a wireless communication channel 310; blocking access to software applications installed on the at least one mobile communication device, by an access management software application, whenever the at least one mobile communication device is detected within a specific area within the defined volume, based on the position determined by the PLU 320; launching, via the access management software application, at least one whitelisted software application, out of the software applications installed on the at least one mobile communication device, responsive to a selection by a human user 330; and repeatedly instructing the at least one mobile communication device, by the PLU and over the wireless communication channel, to re-launch the at least one whitelisted software application, as long as the at least one mobile communication device is detected within the specific area 340.

It is further understood that some embodiments of the present invention may be embodied in the form of a system, a method, or a computer program product. Similarly, some embodiments may be embodied as hardware, software, or a combination of both. Some embodiments may be embodied as a computer program product saved on one or more non-transitory computer-readable medium (or mediums) in the form of computer-readable program code embodied thereon. Such non-transitory computer-readable medium may include instructions that when executed cause a processor to execute method steps in accordance with embodiments. In some embodiments, the instructions stored on the computer-readable medium may be in the form of an installed application and in the form of an installation package.

Such instructions may be, for example, loaded by one or more processors and get executed. For example, the computer-readable medium may be a non-transitory computer-readable storage medium. A non-transitory computer-readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units, and/or circuits have not been described in detail so as not to obscure the invention. Some features or elements described with respect to one embodiment can be combined with features or elements described with respect to other embodiments.

The invention claimed is:

1. A method of managing an access to software applications installed on a mobile communication device, via a phone location unit (PLU) in a defined volume, the method comprising:

determining a position of the at least one mobile communication device, relative to a frame of reference of the defined volume, based on at least one of: angle of arrival, time of flight, or received intensity of radio frequency (RF) signals transmitted by the at least one mobile communication device and received by the PLU located within the defined volume and comprising a transceiver and antennas and further configured to communicate with the at least one mobile communication device over a wireless communication channel;

blocking access to software applications installed on the at least one mobile communication device, by an access management software application, whenever the at least one mobile communication device is detected within a specific area within the defined volume, based on the position determined by the PLU;

launching, via the access management software application, at least one whitelisted software application, out of the software applications installed on the at least one mobile communication device, responsive to a selection by a human user; and repeatedly instructing the at least one mobile communication device, by the PLU and over the wireless communication channel, to re-launch the at least one whitelisted software application, as long as the at least one mobile communication device is detected within the specific area.

2. The method according to claim 1, wherein the wireless communication channel is Bluetooth.

3. The method according to claim 1, wherein the repeatedly instructing is carried out by a Human Interface Devices (HID) script.

4. The method according to claim 1, wherein the defined volume is a vehicle.

5. The method according to claim 4, wherein the specific area is a driver's canopy within the vehicle.

6. A system for managing an access to software applications installed on at least one mobile communication device via a phone location unit (PLU) in a defined volume, the system comprising:

a PLU configured to determine a position of the at least one mobile communication device, relative to a frame of reference of the defined volume, based on at least one of: angle of arrival, time of flight, or received intensity of radio frequency (RF) signals transmitted by the at least one mobile communication device and received by the PLU located within the defined volume and comprising a transceiver and antennas and further configured to communicate with the at least one mobile communication device over a wireless communication channel; and an access management software application installed on the at least one mobile communication device, comprising a set of instructions that when executed on at least one computer processor of the at least one mobile communication device causes the at least one computer processor to:

block access to the software applications installed on the at least one mobile communication device, whenever the at least one mobile communication device is detected by the PLU to be within a specific area within the defined volume, based on the position determined by the PLU;

launch, at least one whitelisted software application, out of the software applications installed on the at least one mobile communication device, responsive to a selection by a human user, wherein the PLU is configured to repeatedly instruct the at least one mobile communication device, over the wireless communication channel, to re-launch the at least one whitelisted software application, as long as the at least one mobile communication device is detected within the specific area.

7. The system according to claim 6, wherein the wireless communication channel is Bluetooth.

8. The system according to claim 6, wherein the repeatedly instructing is carried out by a Human Interface Devices (HID) script.

9. The system according to claim 6, wherein the defined volume is a vehicle.

10. The system according to claim 9, wherein the specific area is a driver's canopy within the vehicle.

11. A server for managing an access to software applications installed on at least one mobile communication device via a phone location unit (PLU) in a defined volume, the server comprising:

a network interface configured to receive, from a PLU, a position of the at least one mobile communication device, relative to a frame of reference of the defined volume, based on at least one of: angle of arrival, time of flight, or received intensity of radio frequency (RF) signals transmitted by the at least one mobile communication device and received by the PLU located within the defined volume and comprising a transceiver and antennas and further configured to communicate with the at least one mobile communication device over a wireless communication channel;

a processing device; and a memory interface comprising a set of instructions that when executed on the processing device, causes the processing device to send the at least one mobile communication device via the network interface instructions that:

block access to the software applications installed on the at least one mobile communication device, whenever the at least one mobile communication device is detected by the PLU to be within a specific area within the defined volume, based on the position determined by the PLU;

launch, at least one whitelisted software application, out of the software applications installed on the at least one mobile communication device, responsive to a selection by a human user, repeatedly instruct the PLU to instruct the at least one mobile communication device, over the wireless communication channel, to re-launch the at least one whitelisted software application, as long as the at least one mobile communication device is detected within the specific area.

12. The server according to claim 11, wherein the wireless communication channel is Bluetooth.

13. The server according to claim 11, wherein the repeatedly instructing is carried out by a Human Interface Devices (HID) script.

14. The server according to claim 11, wherein the defined volume is a vehicle.

15. The server according to claim 14, wherein the specific area is a driver's canopy within the vehicle.

16. A non-transitory computer-readable medium for managing access to software applications installed on at least one mobile communication device via a phone location unit (PLU) in a defined volume, the computer-readable medium comprising a set of instructions that when executed cause at least one computer processor on the at least one mobile communication device to:

receive from the PLU, a position of the at least one mobile communication device, relative to a frame of reference of the defined volume, based on at least one of: angle of arrival, time of flight, or received intensity of radio frequency (RF) signals transmitted by the at least one mobile communication device and received by the PLU located within the defined volume and comprising a transceiver and antennas and further configured to communicate with the at least one mobile communication device over a wireless communication channel;

block access to the software applications installed on the at least one mobile communication device, whenever the at least one mobile communication device is detected by the PLU to be within a specific area within the defined volume, based on the position determined by the PLU;

launch, at least one whitelisted software application, out of the software applications installed on the at least one mobile communication device, responsive to a selection by a human user; and repeatedly re-launch the at least one whitelisted software application, responsive to instructions received from the PLU over the communication channel, as long as the at least one mobile communication device is detected within the specific area.

17. The non-transitory computer-readable medium according to claim 16, wherein the wireless communication channel is Bluetooth.

18. The non-transitory computer-readable medium according to claim 16, wherein the repeatedly instructing is carried out by a Human Interface Devices (HID) script.

19. The non-transitory computer-readable medium according to claim 16, wherein the defined volume is a vehicle.

20. The non-transitory computer-readable medium according to claim 19, wherein the specific area is a driver's canopy within the vehicle.

* * * * *